United States Patent [19]
Loebig

[11] Patent Number: 5,461,613
[45] Date of Patent: Oct. 24, 1995

[54] METHOD FOR PREPARING DE-CENTRALIZED REDUNDANT UNITS IN A COMMUNICATIONS SYSTEM TO BE PLACED IN SERVICE

[75] Inventor: Norbert Loebig, Darmstadt, Germany

[73] Assignee: Siemens Aktiengesellschaft, Munich, Germany

[21] Appl. No.: 249,934

[22] Filed: May 26, 1994

[30] Foreign Application Priority Data

Jun. 16, 1993 [DE] Germany ............... 43 19 877.5

[51] Int. Cl.$^6$ .................. H04L 12/407; H04Q 11/04
[52] U.S. Cl. .................. 370/58.3; 370/61; 379/269; 379/279
[58] Field of Search ............... 370/13, 14, 16, 370/54, 58.1, 58.2, 58.3, 60, 60.1, 94.1, 94.2, 94.3, 99, 61; 379/258, 268, 269, 271, 272, 273, 279; 340/825.03, 826, 827, 825.79, 825.8; 371/8.1, 8.2, 11.1, 11.2, 12

[56] References Cited

U.S. PATENT DOCUMENTS

| | | | |
|---|---|---|---|
| 4,097,695 | 6/1978 | Grace | 370/94.1 |
| 4,156,798 | 5/1979 | Doelz | 370/94.1 |
| 4,491,944 | 1/1985 | Caizergues et al. | 370/58.3 |
| 5,051,982 | 9/1991 | Brown et al. | 370/58.2 |

FOREIGN PATENT DOCUMENTS 0294644  1/1993  European Pat. Off. .

*Primary Examiner*—Alpus Hsu
*Attorney, Agent, or Firm*—Hill, Steadman & Simpson

[57] ABSTRACT

A communication system is prepared to be placed into service, or an in-service system is updated or re-started, by transmitting programs and data into the peripheral equipment of the communication system. So that the availability of the communication system for the connected subscribers remains assured, there is a need for accelerated loading. The loading ensues by segmenting the programs and data on the storage medium at the central station as well as by the transmission of the segments into the designated peripheral units. A synchronous connection is provided between two redundant peripheral units forming a pair and is utilized in the loading event to transfer data or programs as needed between the units of the pair.

18 Claims, 1 Drawing Sheet

METHOD FOR PREPARING DE-CENTRALIZED REDUNDANT UNITS IN A COMMUNICATIONS SYSTEM TO BE PLACED IN SERVICE

BACKGROUND OF THE INVENTION

1. Field of the Invention

The present invention is directed to a method for preparing decentralized redundant units in a communication system to be put in service ("commissioning", the system).

2. Description of the Prior Art

The offering of new performance features and services has led in recent years to an increase in the degree of complexity of contemporary communication systems. This means that a communication system is constructed of a number of subscriber stations (terminals) with procedures that control these stations. These procedures, collaborating with one another, control the communication flow and the respectively requested services. The processing and control of the pending tasks in contemporary communication systems is achieved by a decentralization of executive activities. This means that programs and data that were stored in the central control means in earlier systems and were executed therein have been displaced to the peripheral units and pending tasks are processed at the peripheral units independently of the central control means. In particular, this has the advantage that even an outage of the central control means need not necessarily lead to a total restriction of the communication traffic. The programs and data relating to the peripheral units must, however, be transmitted from an external storage medium to those peripheral units in preparation for placing the communication system in service and must be stored at the peripheral units. This requirement is likewise present after an outage or, respectively, partial outage, of the communication system, or even in the case of an expansion with new peripheral equipment.

For preparation prior to placing the system in service, the peripheral units are loaded with program information (switching-oriented, operation and maintenance and administrative programs) by the central control means and are also loaded with the data associated with the peripheral units (i.e. data identifying equipment location, signaling, authorizations, call numbers, individual characteristics of trunk lines and subscriber line circuits, as well as data with respect to the expansion state and the configuration of the peripheral equipment). The program sets and data sets to be loaded into the peripheral units are substantial and exhibit significant growth as a result of the trend to more and more high-capacity communication systems.

As a consequence of the size of the data sets as well as the large number of programs, however, the loading processes from the external storage medium into the peripheral units require an extremely long time. Since contemporary communication systems are being constantly expanded by new services and performance features, and thus the programs and data which control these systems are also becoming more and more extensive, increasing significance is accorded to the reduction of the loading times. Since other demands related to dependability are generally made of a communication system than are made of many other technical systems and installations such as, for example, data processing systems, the loading events must be executed as quickly as possible so that the communication system is optimally available at any time to all subscribers within the scope of its capacities, a demand that is also made of communication systems by CCITT and Bellcore. This demand is taken into consideration, in particular, not only on the basis of the redundant nature of the central control means and message distribution (buffer) units, but also by the redundancy of the peripheral units themselves. The switching-oriented availability of the communication system is not present or is greatly limited during the loading of the peripheral units or a portion of the peripheral units with program or data information. This requires an optimally fast start, and thus an optimally fast loading of the peripheral units in restart situations for example, after software errors (Bellcore Requirements TR-TSY-509, TR-TSY-512, TA-TSY-284, TA-TSY-1047, CCITT Q.700, Q.706, Q.725). The loading times themselves are primarily limited by the transmission rate of the communication system in the direction to the peripheral units and also by the performance of the central control means in offering the loading information and by the transmission performance at the interface between the central control means and the message distribution units. Since, in case of a malfunction, one half of a redundant peripheral unit must assume the work of the down half without a significant loss of stable connections (Bellcore Requirement permitting a maximum of 64 connections), program and data information are loaded into both halves of the peripheral unit within the format of the start up. Data updatings of the respective halves ensue during operation, for which a synchronous connection is provided between the two halves of the peripheral unit.

European Patent 0 294 644 discloses a method for the transmission of data and programs into the peripheral units of a communication system. In that method programs and data are transmitted into the peripheral units in two transmission processes (stages). The first transmission process is implemented before the beginning of the switching-oriented operational execution, whereas the second transmission process is implemented after the beginning of the switching-oriented operational execution. Subscriber-associated data are reloaded as needed particularly during the second transmission process. A modification of this method in view of the first transmission process for the case of redundant peripheral equipment provided with a synchronous connection is shown in FIG. 1 herein.

As shown in FIG. 1, an external storage medium as well as a central control unit therein are connected via two trunk lines to a pair of redundant message distribution (buffer) units which undertake the error-protected transmission of the loading messages as well as the normal switching-oriented and operation and maintenance control messages. These are in turn connected via further trunk lines to redundant peripheral units arranged in pairs, whereby both message distribution units of the pair are connected to both peripheral units. The peripheral units in each pair of peripheral units are also connected to one another via a synchronous line. The loading of programs and data from the external storage medium to the peripheral units occurs such that all programs and data are first divided into a plurality of parts. Subsequently, a transmission is then implemented via both trunk lines to the respective message distribution units connected thereto. From these latter units, the transmission of the respective parts of the data and programs to the peripheral units a pair to be loaded then ensues. Ultimately, all of the programs and data relating to the peripheral units are completely stored in each unit of each pair of redundant peripheral units after the loading event. Updated data are transmitted between both peripheral units in a pair during the switching-oriented operation via the synchronous connection, so that a switch can be immediately undertaken given outage of one peripheral unit to the redundant peripheral unit in the pair and this latter unit can assume the switching-oriented communication traffic without delay and optimally loss-free on the basis of its updated data.

A problem associated with this known procedure is that the entire program controlling the peripheral units as well as all data connected therewith, particularly base loading data, must be loaded into each peripheral unit of each pair of redundantly peripheral units within the format of the first transmission process, using both message distribution units. The message distribution units that determine the loading time are thus in fact fully used however, they redundantly transmit the loading information into a pair of redundant peripheral units. This problem acquires a further dimension when one takes the fact into consideration that a specific task is assigned to each peripheral unit. Thus, for example, specific peripheral units are exclusively responsible for the transmission of the data that are sent from other communication systems (trunk line unit), whereas other peripheral units exclusively process data from subscriber terminal equipment (subscriber line unit). In this respect, the problem thus arises in this known system that different complete programs must be loaded into different subsets of the pairs of peripheral units. This occurs by multiple, successive execution of the aforementioned sequences or by forming a complete program that covers all associated programs of a given type.

SUMMARY OF THE INVENTION

An object of the invention is to provide a method with which programs and data can be loaded in accelerated fashion into the redundant peripheral units and thus to enhance the availability of the overall communication system.

The above object is achieved in accordance with the principles of the present invention in a method for preparing a communication system to be placed into service, the system having a central station containing a storage medium, two redundant message distribution units connected via respective first trunks to the storage medium, a plurality of pairs of redundant peripheral units, each peripheral unit in each pair being connected to each message distribution unit via respective second trunks, each pair of peripheral units having a synchronous connection between the peripheral units in the pair, the storage medium containing a program to be transmitted from the central station to peripheral units in the pairs via the first trunks, the message distribution units and the second trunks during a loading event, including the following steps. The program is divided into a plurality of loading segments, the loading segments including first and second shared program segments and first, second, third and fourth specific program segments. The first specific program segment is transmitted to one peripheral unit in each pair via one of the message distribution units, the second specific program segment is transmitted to the other peripheral unit in each pair via the same message distribution unit, the third specific program segment is transmitted to the aforementioned one peripheral unit in each pair via the other of the message distribution units, and the fourth specific program segment is transmitted to the other peripheral unit in each pair via the other of the message distribution units. The first, second, third and fourth specific program segments are exchanged between the peripheral units in each pair via the synchronous connection. This exchange takes place isochronously with the various transmitting steps described above. This results in each peripheral unit in each pair containing all of the first, second, third and fourth specific program segments. After completing the isochronous transmitting steps and the exchange, the first shared program segment is transmitted to each peripheral unit in each pair via the aforementioned one of the message distribution units, and the second shared program segment is transmitted to each peripheral unit in each pair via the other of the message distribution units.

An advantage of the invention is the division of each program to be loaded into a program part shared in common by all peripheral units as well as into program parts that are specifically designated for only one of the peripheral units in each of the affected pairs of peripheral units. These specific, "half-associated" parts are thereby first transmitted into the peripheral units of the redundant pair of peripheral units via trunk lines, by loading different, specific parts of the respective program respectively into the peripheral units of the redundant pair. Since both peripheral units must have the same program during the switching-oriented communication traffic in order to be able to switch between the peripheral units of the redundant pair without time delay and optimally loss-free given the outage of a peripheral unit, an exchange of the different, specific parts occurs via the synchronous connection, so that both peripheral units of a redundant pair have stored the same program parts after the completion of the exchange. Following the transmission procedure of the different, specific program parts into the peripheral, redundant units via the message distribution units and parallel to the transmission procedure via the synchronous connection, the shared program parts are then simultaneously transmitted into each of the peripheral units of the pair. Such a procedure is especially advantageous where the transmission performance of the synchronous connection is less than twice as high as the transmission performance of a trunk line between message distribution unit and a peripheral unit. Such a procedure also has the advantage that the entire program is no longer loaded into one half of a redundant pair of peripheral units, but only the half-associated and shared parts are now loaded into each peripheral unit of the pair.

In a further embodiment of the invention the programs relating to the peripheral units are divided into exclusively specific loading segments. The loading of the specific loading segments then correspondingly ensues as recited above. Further, an exchange of the loading segments already loaded into the respective peripheral units of a pair is also implemented contemporaneously with the loading of the program information via the trunk lines between message distribution unit and a peripheral unit. Such a procedure is particularly advantageous when the transmission performance of the synchronous connection is at least twice as great as the transmission performances of a trunk line between a message distribution unit and a peripheral unit.

In another embodiment a plurality of programs are contemporaneously loaded into n different groups of peripheral units. This has the advantage that the programs are functionally loaded only into the peripheral units which need to have a particular type of program. For example, the program having functions for executing the traffic to the subscriber terminal equipment is only loaded into the peripheral units comprising a group to which only subscriber terminals are connected.

In a further embodiment the segmenting and loading of data into the peripheral equipment is implemented in a corresponding way after at least one program has been loaded into the peripheral equipment. This has the advantage that not only program information can be loaded proceeding from the external storage medium, but also data stored in the external storage medium can be loaded in an accelerated manner into the designated peripheral equipment.

In another embodiment the transmission of the respective program or data segments via the first and second trunk lines as well as on the respective synchronous connections is implemented in compressed form. This has the advantage that all of the loading events can be further accelerated by means of the utilization of specific transmission methods.

The segmenting of programs or data can be implemented before the commissioning of the communication system, or before the reintroduction of the program into a communication system already in service. To this end the programs or data are stored segmented on the storage medium and a functional allocation of the respective program segments or data segments to a specific peripheral unit is stored in a table. This has the advantage that, particularly after malfunction, the restart of the communication system which requires the corresponding loading events to be undertaken can be executed in rapid chronological succession.

In another embodiment programs or data are stored in non-segmented form on the storage medium, and the segmenting of the programs or data is only implemented as needed by the control means. The transmission of the program segments or data segments ensues by employing of a table wherein a functional allocation of the respective program segments or data segments to specific peripheral units is stored. This has the advantage that the entire software of the communication system can be stored in unsegmented fashion on the storage medium.

DESCRIPTION OF THE PREFERRED EMBODIMENTS

Figure 1:
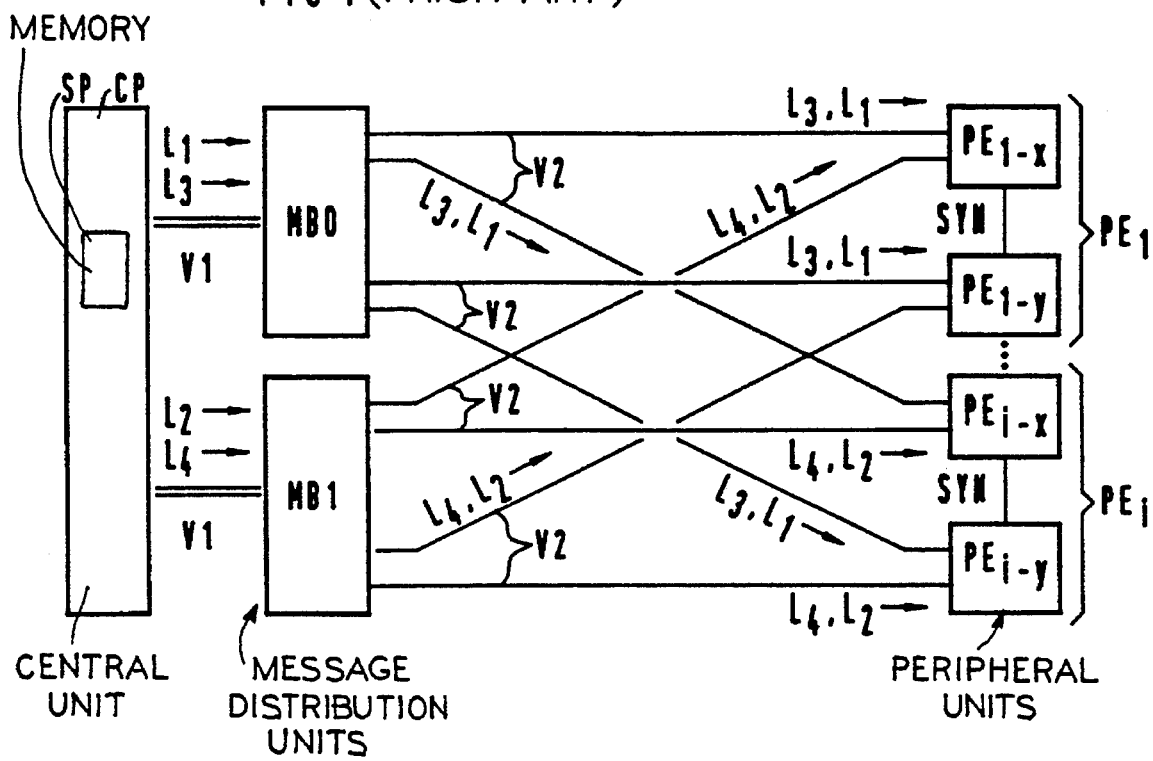
FIG. 1 is a schematic block diagram of a communication system having a central station and a number of peripheral units, of the type known in the art.
Figure 2:
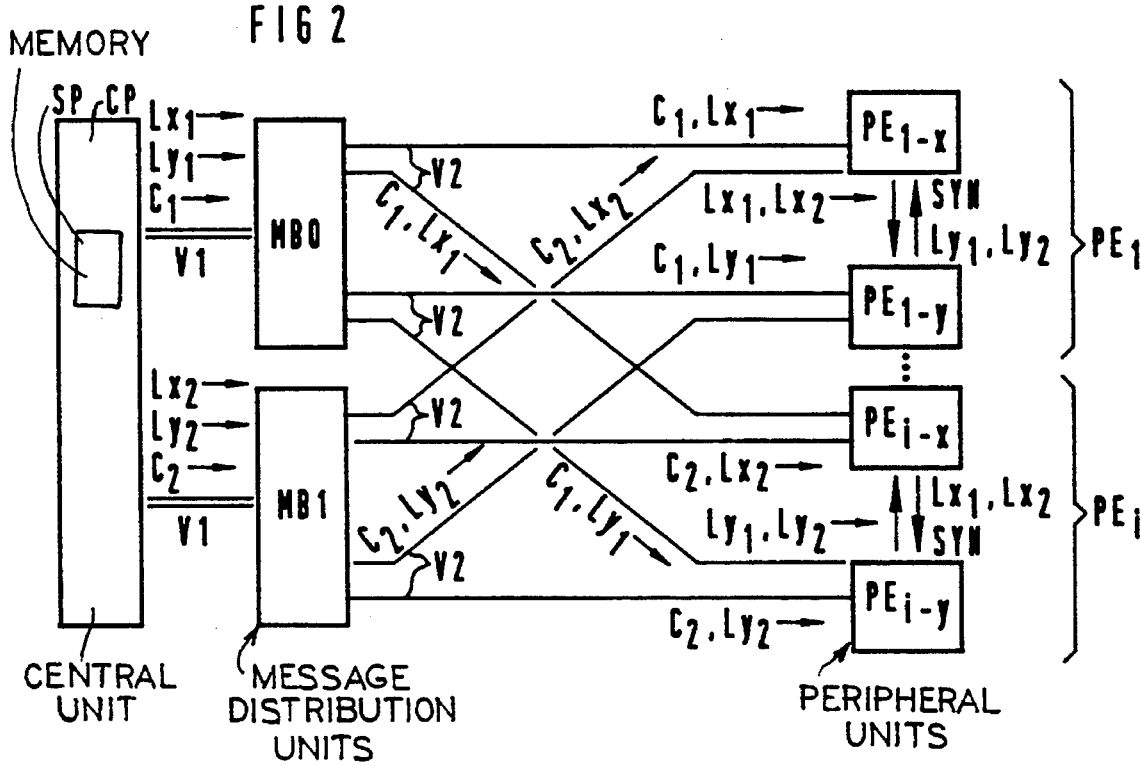
FIG. 2 is a schematic block diagram of a communication system having a central station and a plurality of peripheral units constructed and operating in accordance with the principles of the present invention.

FIG. 2 shows an external storage medium SP with a central control unit CP. The central control unit CP is connected via redundant trunks V1 to a pair of redundant message distribution (buffer) units MB0 and MB1. The information proceeding from the storage medium SP via the central control unit CP is transmitted via both trunks V1. Further, the message distribution units MB0 and MB1 are connected to pairs of peripheral equipment $PE_i$ via further trunks V2 such that each message distribution unit MB0 and MB1 is connected to each peripheral unit $PE_{i-x}$ and $PE_{i-y}$ of all pairs of redundant peripheral units $PE_i$. This means that each peripheral unit $PE_{i-x}$ and $PE_{i-y}$ of each pair of redundant peripheral units $PE_i$ is connected both to the message distribution unit MB0 as well as to the message buffer distribution unit MB1. Further, both peripheral units $PE_{i-x}$ and $PE_{i-y}$ in each pair of redundant peripheral units $PE_i$ are connected to one another via a synchronous connection SYN.

It is assumed below that a program P is stored in the storage medium SP. This program P is to be loaded into the peripheral units $PE_i$. The loading usually ensues when the communication system is placed in service or given an outage of peripheral equipment that requires the system to be subsequently restarted.

It is also assumed that the transmission performance of the synchronous connection SYN is less than twice that of a trunk V2. In this case, the program P is divided into loading segments C1 and C2 shared by all the peripheral units $PE_i$ as well as into specific loading segments LX1, LX2 and LY1, LY2. The shared loading segments C1 as well as the specific loading segments LX1 and the specific loading segments LY1 are thereby transmitted to the message distribution unit MB0 via the trunk V1. In the same way, the second shared loading segments C2 as well as the specific loading segments LX2 and the specific loading segments LY2 are transmitted to the message distribution unit MB1 via the other trunk V1. Further, the specific loading segments LX1 are transmitted to the peripheral units $PE_{i-x}$ via the trunks V2. In the same way, the specific loading segments LX1 are transmitted from the message distribution unit MB0 to the peripheral units $PE_{i-y}$ via respective ones of the trunks V2.

Further, the specific loading segments LX2 are transmitted from the message distribution unit MB1 to the peripheral units $PE_{i-x}$ via the trunks V2 and the specific loading segments LY2 are transmitted from the message distribution unit MB1 to the peripheral units $PE_{i-y}$ via respective ones of the trunks V2.

The specific loading segments LX1 and LX2 are thus stored in the peripheral units $PE_{i-x}$ and the specific loading segments LY1 and LY2 are stored in the peripheral units $PE_{i-y}$. Both peripheral units $PE_{i-x}$ and $PE_{i-y}$ of a pair of redundant peripheral units $PE_i$, however, must have identical programs or data stored therein if a switch is to be made from one unit in the pair to the other in the event of a malfunction. To this end, an exchange of the specific loading segments LX1, LX2 and, LY1, LY2 occurs via the synchronous connection SYN isochronously with the transmission events via the trunk V2. Since the transmission performance of the synchronization connection SYN is less than twice that of a trunk V2, these transmission events can only be implemented with "backup". The time for clearing up this back-up is therefore used for the parallel transmission of the shared loading segments C1 and C2 via the trunks V2. Immediately after all specific loading segments LX1 and LY1 are loaded into the respective peripheral units, the shared loading segments C1 are transmitted to the peripheral units $PE_i$. In the same way, the shared loading segments C2 are transmitted to the peripheral units $PE_i$ immediately after the loading of the specific loading segments LX2 and LY2 into the respective peripheral units. The loading segments C1 are thereby transmitted by the message distribution unit MB0 via the trunks V2 to the peripheral units $PE_{i-x}$ and $PE_{i-y}$ and the loading segments C2 are transmitted from the message distribution unit MB1 via the trunks V2 to the peripheral units $PE_{i-x}$ and $PE_{i-y}$.

The shared loading segments C1 and C2 as well as the specific loading segments LX1, LX2, LY1 and LY2 are thus stored in all peripheral equipment $PE_{i-x}$ and $PE_{i-y}$ after the last transmission event.

If the transmission performance of the synchronous connection SYN is at least twice that of one of the trunks V2, the division into shared loading segments is not necessary. In this case, the program P stored in the storage medium SP is merely divided into specific loading segments LX1, LX2, LY1, and LY2. The transmission of these loading segments into the peripheral equipment then ensues in the same way as set forth above.

The procedures that have just been set forth, however, are not limited to the loading of a program P; data D stored in the storage medium SP can be segmented in the same way according to the same principle and can be transmitted to the appropriate peripheral units $PE_i$. Special transmission methods can be employed when loading programs P or data D. For example, one such transmission method is the employment of a principle known in transmission technology as a compression algorithm.

In a further embodiment of the invention the programs $P_i$ or data $D_i$ are segmented before the commissioning of the communication system. This means that the programs $P_i$ and data $D_i$ are already stored segmented on the storage medium SP and a table T is provided which only contains a functional allocation of the respective program segments or data segments to a specific peripheral unit. In this case, the transmission events can ensue immediately into the respective peripheral units $PE_i$ upon commissioning of the communication system.

In a further embodiment the programs Pi or data Di stored in non-segmented form in the storage medium SP. This means that the segmenting must first be implemented upon transmission of the programs $P_i$ or data $D_i$. The transmission of the program segments or data segments then likewise ensues utilizing a table T, as just set forth.

The saving of loading time of the invention be calculated for a specific realized example:
It is assumed below that the length of the program P to be loaded is $$|L|=3 \text{ MB},$$

the useful data rate on the trunks V2 is $$G=5.5 \text{ kB/s},$$

the useful data rate on the synchronous connection SYN is $$g=4.8 \text{ kB/s}.$$

An optimum segmenting is characterized by:
length of the shared loading segments $$|C|=|C1|+|C2|=2 \ |C1|,$$

length of the x-specific loading segments $$|Lx|=|LX1|+|LX2|=2 \ |LX1|,$$

length of the y-specific loading segments $$|LY|=|LY1|+|LY2|=2 \ |LY2|=|Lx|.$$

The condition that the trunks V1 and V2 each have a transmission rate which is at least twice that of the synchronous connection SYN means that the loading time via both trunks V2≧loading time via the synchronous connection SYN or, mathematically considered:

$$(|L|-|Lx|)/(2*G) \geq |Lx|/g \text{ or}$$

$$|Lx| \geq |L|*g/(2G+g).$$

An optimum dimensioning is thus:

$$|Lx|=|LY|=0.9 \text{ MB and } |C|=1.2 \text{ MB}.$$

Using conventional methods, the program to be loaded is loaded into both peripheral units $PE_{i-x}$, $PE_{i-y}$ via the respective trunks V2. Mathematically considered, this yields the loading time:

$$|L|/2G=273 \text{ s}.$$

The loading time given employment of the method of the invention is $$(|L_x|+|c|)/2G=191 \text{ s}.$$

Thus a reduction of approximately 30% is achieved.

Given an adequately high-capacity synchronous connection SYN (2G>g), the optimum segmenting is derived as:

$$|L_x|=|L_y|=|L|/2 \text{ and } |C|=0.$$

A reduction of the loading time by approximately 50% is thereby achieved.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for preparing a communication system to be placed into service, said communication system having a central station containing a storage medium, two redundant message distribution units connected via respective first trunks to said storage medium, a plurality of pairs of redundant peripheral units, both peripheral units in a pair being connected to each message distribution unit via respective second trunks, each pair of peripheral units having a synchronous connection between the peripheral units in the pair, said storage medium containing at least one program to be transmitted from said central station to peripheral units in said pairs of peripheral units via said first trunks, said message distribution units and said second trunks during a loading event, said method comprising the steps of:

(a) dividing said program into a plurality of loading program segments, said loading program segments including first and second shared program segments and first, second, third and fourth specific program segments;

(b) transmitting said first specific program segment to one peripheral unit in each pair via one of said message distribution units, transmitting said second specific program segment to the other peripheral unit in each pair via said one of said message distribution units, transmitting said third specific program segment to said one peripheral unit in each pair via the other of said message distribution units, and transmitting said fourth specific program segment to said other peripheral unit in each pair via said other of said message distribution units;

(c) exchanging said first, second, third and fourth specific program segments between said peripheral units in each pair via said synchronous connection isochronously with step (b), so that each peripheral unit in each pair contains all of said first, second, third and fourth specific program segments; and (d) after completion of step (b) and isochronously with step (c), transmitting said first shared program segment to each peripheral unit in each pair via said one of said message distribution units and transmitting said second shared program segment to each peripheral in each pair via said other of said message distribution units.

2. A method as claimed in claim 1 wherein said communication system includes a plurality of programs in said storage medium and wherein said pairs of peripheral units are divided into a plurality of groups, with each group designated to receive a different one of said programs, and wherein each of said programs is respectively transmitted isochronously to the peripheral unit pair designated to receive the program according to steps (a), (b), (c) and (d).

3. A method as claimed in claim 1 wherein steps (b) and (d) are further defined by transmitting said first, second, third and fourth specific program segments and said first and second shared program segments on said first and second trunks in compressed form.

4. A method as claimed in claim 1 wherein step (a) is further defined by the steps of:

storing said program in said storage medium in segmented form;

storing a table in said storage medium allocating said program segments to respective peripheral units; and wherein steps (b) and (d) are further defined by transmitting said program segments to said peripheral units based on said table.

5. A method as claimed in claim 1 wherein step (a) is further defined by the steps of:

storing said program in said storage medium in non-segmented form;

storing a table in said storage medium allocating said program segments to respective peripheral units; and dividing said program into said plurality of program segments, as needed, prior to steps (b) and (d) based on said table.

6. A method as claimed in claim 1 wherein said communication system further includes data stored in said storage medium to be transmitted from said central station to said peripheral units in said pairs of peripheral units via said first trunks, said message distribution units and said second trunks during said loading event, and said method comprising the additional steps, following step (d), of:

(e) dividing said data into a plurality of loading data segments, said loading data segments including first and second shared data segments and first, second, third and fourth specific data segments;

(f) transmitting said first specific data segment to one peripheral unit in each pair via one of said message distribution units, transmitting said second specific data segment to the other peripheral unit in each pair via said one of said message distribution units, transmitting said third specific data segment to said one peripheral unit in each pair via the other of said message distribution units, and transmitting said fourth specific data segment to said other peripheral unit in each pair via said other of said message distribution units;

(g) exchanging said first, second, third and fourth specific data segments between said peripheral units in each pair via said synchronous connection isochronously with step (f), so that each peripheral unit in each pair contains all of said first, second, third and fourth specific data segments; and (h) after completion of step (f) and isochronously with step (g), transmitting said first shared data segment to each peripheral unit in each pair via said one of said message distribution units and transmitting said second shared data segment to each peripheral in each pair via said other of said message distribution units.

7. A method as claimed in claim 6 wherein steps (f) and (h) are further defined by transmitting said first, second, third and fourth specific data segments and said first and second shared data segments on said first and second trunks in compressed form.

8. A method as claimed in claim 6 wherein step (e) is further defined by the steps of:

storing said data in said storage medium in segmented form;

storing a table in said storage medium allocating said data segments to respective peripheral units, and wherein steps (f) and (h) are further defined by transmitting said data segments to said peripheral units based on said table.

9. A method as claimed in claim 6 wherein step (e) is further defined by the steps of:

storing said data in said storage medium in non-segmented form;

storing a table in said storage medium allocating said data segments to respective peripheral units; and dividing said data into said plurality of data segments, as needed, prior to steps (f) and (h) based on said table.

10. A method for preparing a communication system to be placed into service, said communication system having a central station containing a storage medium, two redundant message distribution units connected via respective first trunks to said storage medium, a plurality of pairs of redundant peripheral units, both peripheral units in a pair being connected to each message distribution unit via respective second trunks, each pair of peripheral units having a synchronous connection between the peripheral units in the pair, said storage medium containing at least one program to be transmitted from said central station to peripheral units in said pairs of peripheral units via said first trunks, said message distribution units and said second trunks during a loading event, said method comprising the steps of:

(a) dividing said program into a plurality of loading segments, said loading segments including first, second, third and fourth specific program segments;

(b) transmitting said first specific program segment to one peripheral unit in each pair via one of said message distribution units, transmitting said second specific program segment to the other peripheral unit in each pair via said one of said message distribution units, transmitting said third specific program segment to said one peripheral unit in each pair via the other of said message distribution units, and transmitting said fourth specific program segment to said other peripheral unit in each pair via said other of said message distribution units; and (c) exchanging said first, second, third and fourth specific program segments between said peripheral units in each pair via said synchronous connection isochronously with step (b), so that each peripheral unit in each pair contains all of said first, second, third and fourth specific program segments.

11. A method as claimed in claim 10 wherein said communication system includes a plurality of programs in said storage medium and wherein said pairs of peripheral units are divided into a plurality of groups, with each group designated to receive a different one of said programs, and wherein each of said programs is respectively transmitted isochronously to the peripheral unit pair designated to receive the program according to steps (a), (b) and (c).

12. A method as claimed in claim 10 wherein step (b) is further defined by transmitting said first, second, third and fourth specific program segments on said first and second trunks in compressed form.

13. A method as claimed in claim 10 wherein step (a) is further defined by the steps of:

storing said program in said storage medium in segmented form;

storing a table in said storage medium allocating said program segments to respective peripheral units; and wherein step (b) is further defined by transmitting said program segments to said peripheral units based on said table.

14. A method as claimed in claim 10 wherein step (a) is further defined by the steps of:

storing said program in said storage medium in non-segmented form;

storing a table in said storage medium allocating said program segments to respective peripheral units; and dividing said program into said plurality of program segments, as needed, prior to step (b) based on said table.

15. A method as claimed in claim 10 wherein said communication system further includes data stored in said storage medium to be transmitted from said central station to said peripheral units in said pairs of peripheral units via said first trunks, said message distribution units and said second trunks during said loading event, and said method comprising the additional steps, following step (c), of:

(d) dividing said data into a plurality of loading data segments, said loading data segments including first, second, third and fourth specific data segments;

(e) transmitting said first specific data segment to one peripheral unit in each pair via one of said message distribution units, transmitting said second specific data segment to the other peripheral unit in each pair via said one of said message distribution units, transmitting said third specific data segment to said one peripheral unit in each pair via the other of said message distribution units, and transmitting said fourth specific data segment to said other peripheral unit in each pair via said other of said message distribution units; and (f) exchanging said first, second, third and fourth specific data segments between said peripheral units in each pair via said synchronous connection isochronously with step (f), so that each peripheral unit in each pair contains all of said first, second, third and fourth specific data segments.

16. A method as claimed in claim 15 wherein step (e) is further defined by transmitting said first, second, third and fourth specific data segments on said first and second trunks in compressed form.

17. A method as claimed in claim 15 wherein step (d) is further defined by the steps of:

storing said data in said storage medium in segmented form;

storing a table in said storage medium allocating said data segments to respective peripheral units; and wherein step (e) is further defined by transmitting said data segments to said peripheral units based on said table.

18. A method as claimed in claim 15 wherein step (d) is further defined by the steps of:

storing said data in said storage medium in non-segmented form;

storing a table in said storage medium allocating said data segments to respective peripheral units; and dividing said data into said plurality of data segments, as needed, prior to step (e) based on said table.

* * * * *